United States Patent [19]
Jenkins

[11] 4,096,533
[45] Jun. 20, 1978

[54] CARTRIDGE TAPE TRANSPORT WHICH ACCOMMODATES SINGLE OR DUAL CAPSTAN CARTRIDGES

[75] Inventor: John P. Jenkins, Towanda, Ill.

[73] Assignee: International Tapetronics Corporation, Bloomington, Ill.

[21] Appl. No.: 791,707

[22] Filed: Apr. 28, 1977

[51] Int. Cl.² ............................................. G11B 15/18
[52] U.S. Cl. ........................................ 360/94; 360/93
[58] Field of Search .......................................... 360/94

[56] References Cited
U.S. PATENT DOCUMENTS

| | | | |
|---|---|---|---|
| 3,482,839 | 12/1969 | Wolfner | 360/94 |
| 3,547,447 | 12/1970 | Nakamori | 360/94 |
| 3,594,008 | 7/1971 | Takagi | 360/94 |
| 3,656,761 | 4/1972 | Laschenski | 360/94 |

*Primary Examiner*—Robert S. Tupper
*Attorney, Agent, or Firm*—McCaleb, Lucas & Brugman

[57] ABSTRACT

A dual capstan tape transport mechanism having a magnetic tape trained along a path for movement successively between an upstream capstan and pressure roller, past record and play heads, and between a downstream capstan and pressure roller. A motor drives the downstream capstan directly and drives the upstream capstan indirectly, and slightly slower, through an overrunning clutch. Separate solenoids move the pressure rollers to press the tape against the respective capstans. The mechanism is selectible to play either an improved dual capstan type cartridge with both capstans, or to play a conventional single capstan type cartridge with the downstream capstan alone. Tape guide posts, aligning the tape and providing wrap around the heads, and a shield engageable with the backside of the tape opposite the play head, are movable with the upstream pressure roller through openings in the housing of the dual capstan cartridge.

6 Claims, 12 Drawing Figures

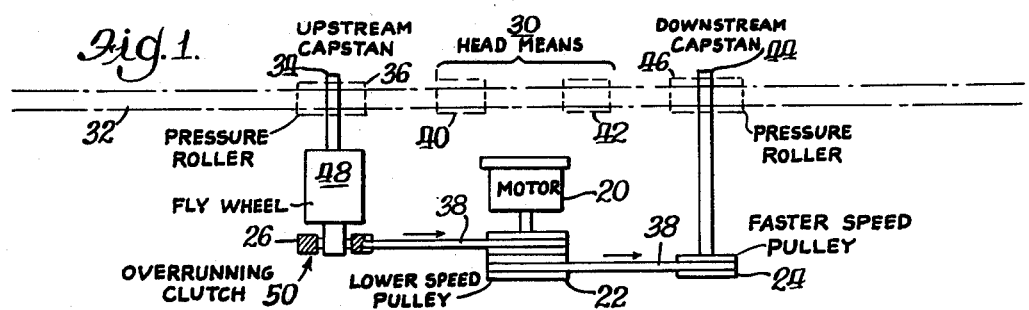
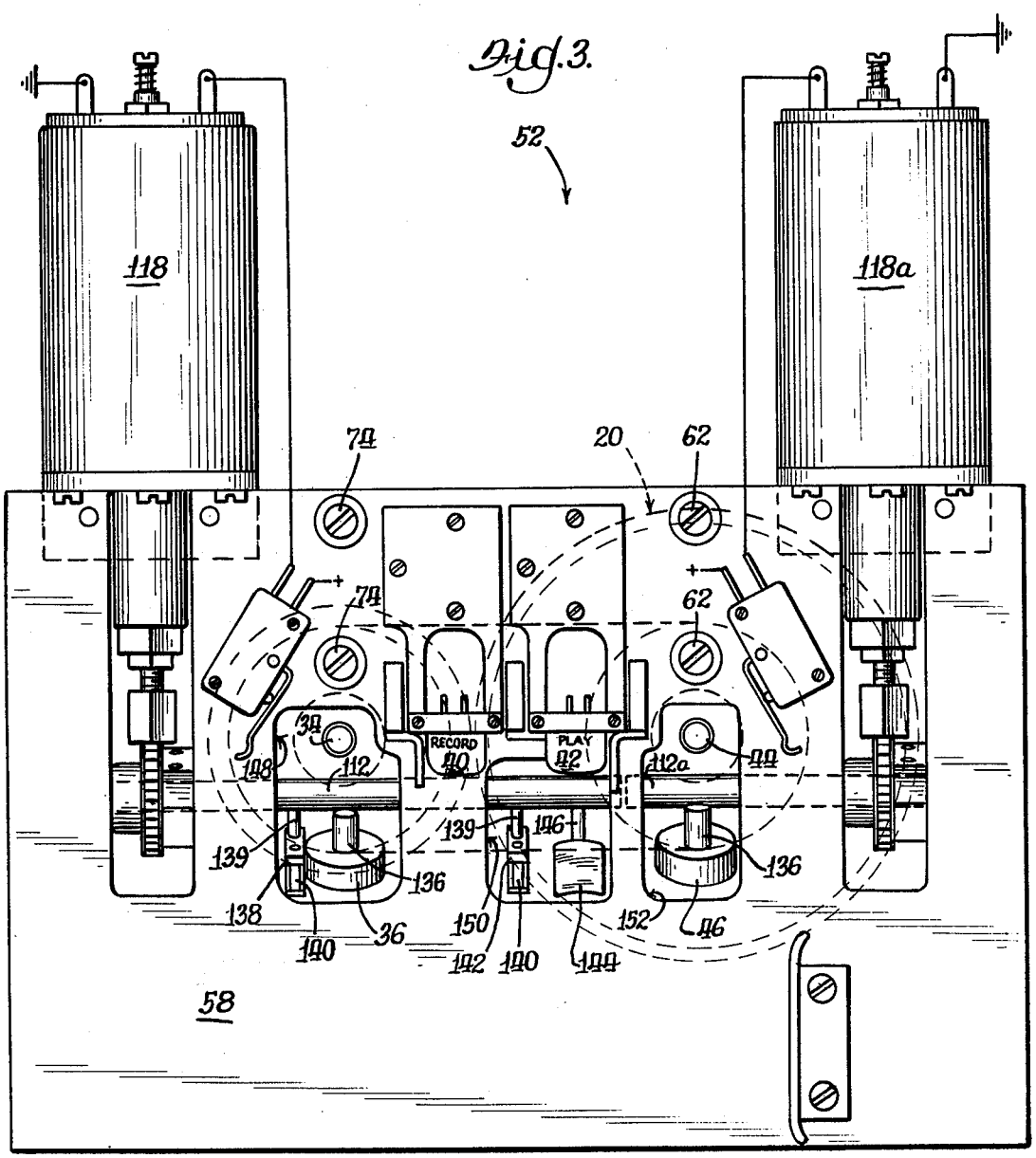

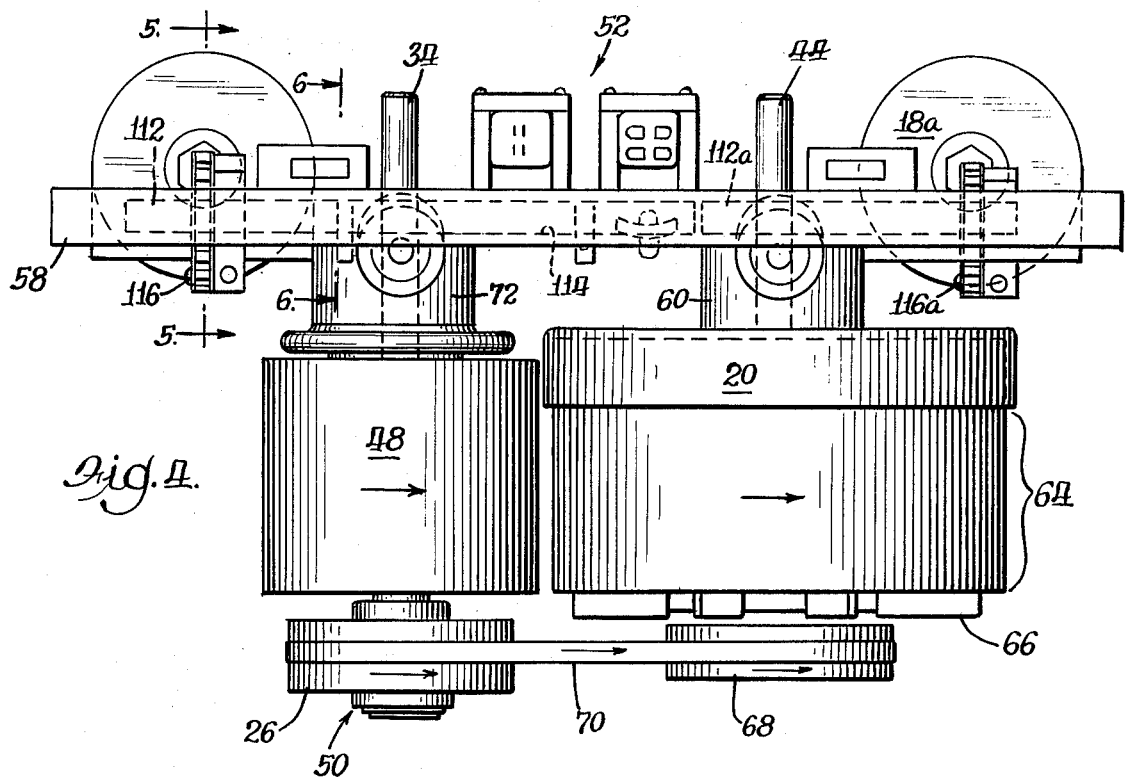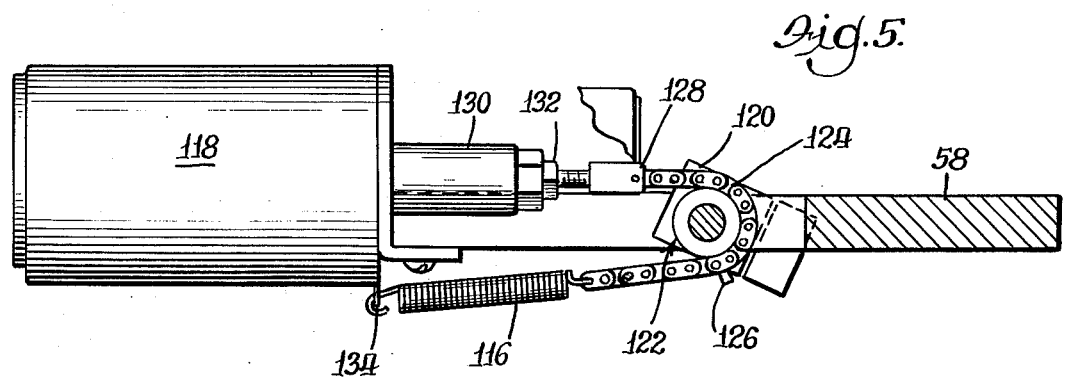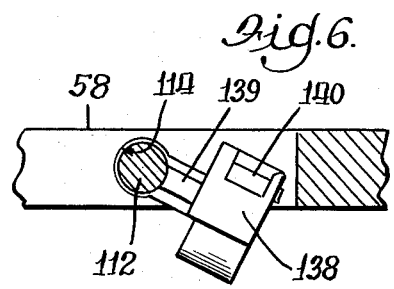

CARTRIDGE TAPE TRANSPORT WHICH ACCOMMODATES SINGLE OR DUAL CAPSTAN CARTRIDGES

BACKGROUND OF THE INVENTION

The field of the invention is magnetic tape recording and reproducing apparatus of the kind used in commercial broadcasting.

The National Association of Broadcasters Size A Cartridge has become the standard for the radio broadcasting industry, and is widely used in single capstan tape transport mechanisms. It has a rectangular plastic housing containing an endless tape trained along an apertured sidewall for movement successively as follows:

(a) From the inside of a rotatable storage roll around a stationary, upstream guide post;
(b) past a first pressure pad which presses the tape against the curved face of a recording head;
(c) around a stationary intermediate guide post;
(d) past a second pressure pad which presses the tape against the curved face of a playback head;
(e) between a capstan and pinch roller which are mounted on the tape transport mechanism; and
(f) around a stationary, downstream guide post, to the outside of the rotatable storage roll.

This cartridge, although a great step forward when initially adopted, has a number of disadvantages for present day high precision broadcasting requirements as follows:

(1) The upstream, intermediate, and downstream guideposts are all integral parts of the molded plastics case. Being of plastics material, and being subject to warping with the case, they cause tape skew, and phase error in stereo recording and reproducing.

(2) The pressure pads are supposed to conform the tape to 5°–7° approach and departure angles as it passes the heads, but this is not absolutely uniform due to the fact that the pads are made of resilient, cellular, elastomeric materials. Pressure, and approach and departure angles, are not precisely uniform on all tracks, and variations in sliding friction between the tape and pads can create a number of problems including phase errors and poor low frequency response.

(3) The presence of a pressure pad behind the tape opposite the playback head prevents the use of a shield at that same location. The absence of such a shield requires the use of a special playback head casing having tiny windows surrounding the pole pieces, to minimize the effect of the magnetic field of the drive motor on playback reproduction. Unfortunately, the close proximity of the window edges to the pole pieces causes resonance up to about 150 cycles per second, thereby providing still another cause for poor low frequency response.

In summary, standard single capstan type cartridges have a number of inherent disadvantages including one or more of the following: phase error in stereo, low frequency resonance, and poor low frequency response.

SUMMARY OF THE INVENTION

It is a general object of the present invention to provide a dual capstan tape transport mechanism, and an improved cartridge for it, which eliminates the above-mentioned disadvantages of the standard single capstan type.

Another object of the invention is to provide a compatible tape transport mechanism which is automatically convertible for use either with the improved dual capstan type cartridge or the standard single capstan type.

Another object is to provide a compatible tape transport mechanism for use with dual or single capstan type cartridges, in which two pinch or pressure rollers are separately mounted for independent movement toward corresponding capstans, and one or both pressure rollers as required are automatically moved against the capstan or capstans in response to insertion of a single or dual capstan type cartridge in the mechanism.

Another object is to provide a dual capstan tape transport mechanism and an improved cartridge for use with it in which all the tape driving and guiding elements are part of the tape transport mechanism itself and therefore can be made with the high precision needed to move the tape uniformly straight across the head to keep multiple tracks in phase, and to provide good low frequency response with minimum resonance.

Another object is to provide such a tape transport mechanism, and an improved cartridge for it, in which a shield carried by the tape transport mechanism is movable through an opening in the cartridge case to place it in play mode in a position behind the tape opposite the playback head.

Another object is to provide a dual capstan type tape transport mechanism where both the upstream and downstream capstans (considered with respect to the direction of movement of the tape) are motor driven in the off mode with the upstream capstan rotating slightly slower; and in play mode, both capstans rotate at the same speed with the downstream capstan motor driven and the upstream capstan tape driven independent of the motor.

An important feature of the dual capstan type tape transport mechanism is that in the off mode, the motor drives the downstream capstan at play speed and the upstream capstan at slightly slower speed, and in the play mode, an overrunning clutch between the drive motor and the upstream capstan disengages enabling the tape to pull the upstream capstan up to play speed while the upstream capstan free wheels or "floats" independent of the drive motor.

Other objects and advantages will be apparent from the following description taken in connection with the accompanying drawings.

BRIEF DESCRIPTION OF THE DRAWINGS

FIG. 1 is a schematic view illustrating the principle of operation of a dual capstan type tape transport mechanism in which a motor drives the downstream capstan directly and drives the upstream capstan indirectly, through an overrunning clutch;

FIG. 2 is a top view of FIG. 1;

FIG. 3 is the top plan view of a preferred embodiment of a compatible tape transport mechanism which is capable of playing either a standard single capstan type cartridge or the improved dual capstan type cartridge disclosed here, the mechanism being shown in off mode;

FIG. 4 is a front elevation of FIG. 3;

FIGS. 5 and 6 are fragmentary sectional views of FIG. 4 taken along lines 5—5 and 6—6 respectively;

Like parts are referred to by like reference characters.

DETAILED DESCRIPTION OF PREFERRED EMBODIMENTS

Figure 7:
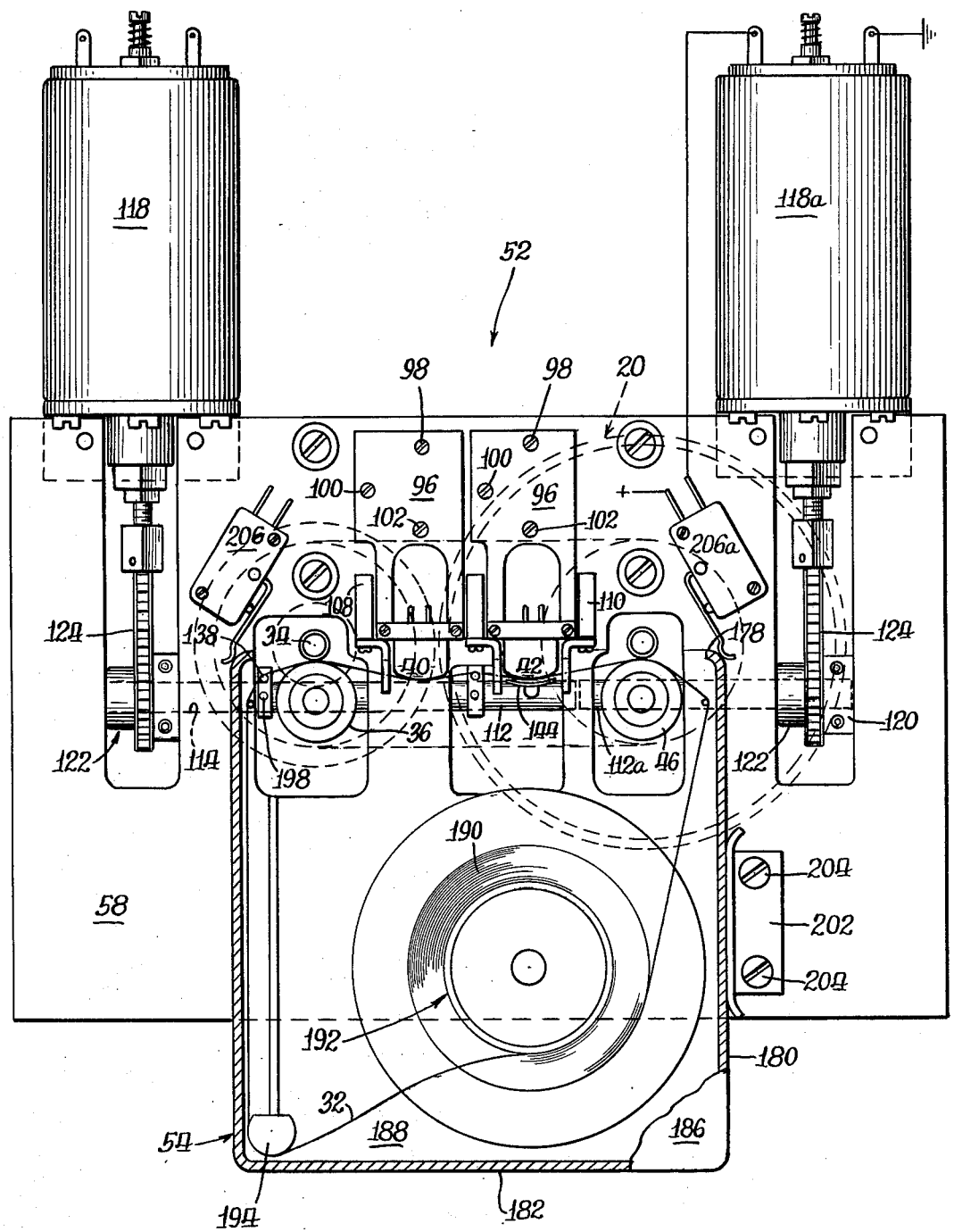
FIG. 7 is a plan view similar to FIG. 3 showing the tape transport mechanism in play mode with the improved dual capstan type cartridge.

As employed here, the terms "play", "play position" and "play head" are intended to encompass "record", "record position" and "record head", respectively. It should also be understood throughout the description that the tape transport mechanism has both stereo and mondural capabilities in connection with the tapes and cartridges employed. The terms "downstream" and "upstream" are with respect to the direction of movement of the maagnetic tape which is from left to right in many of the drawing figures.

Referring now to the specific embodiments of the invention in the drawings, FIGS. 1 and 2 illustrate schematically a principle of operation of the dual capstan tape transport mechanism. A motor 20 with a wide pulley 22 drives pulleys 24 and 26 through belts 28 and 30. Magnetic tape 32 is trained along a path for movement successively between an upstream capstan 34 and an upstream pressure or pinch roller 36, past head means 38 consisting of record and play heads 40 and 42, and between a downstream capstan 44 and a downstream pressure or pinch roller 46. Pulley 24 drives downstream capstan 44 directly. Pulley 26 drives upstream capstan 34 and attached flywheel 48, indirectly, through an overrunning clutch generally designated 50 which will be described in detail in connection with FIGS. 9 and 10. While the capstans themselves are preferably the same diameter, for example about 0.318 inches, the upstream pulley 26 is slightly larger than the downstream pulley 24. This enables motor 20 to rotate the upstream capstan at a slightly slower speed than the downstream capstan.

In use, the motor may be energized continuously, rotating the capstans even in the off mode when the pressure rollers 36, 46 are retracted from the tape. Thus, by avoiding starting and stopping of the motor, with attendant heating and cooling, the motor runs at a constant speed, lasts a long time and stays quiet. When the mechanism is placed in play mode, pressure rollers 36, 46 press the tape 32 into frictional driving or driven relationship with the respective capstans. For an instant, following contact by the two pressure rollers, the portion of the tape at the downstream capstan 44 is moved faster than the portion at the upstream capstan 34. From that instant tape speed is controlled by the downstream capstan which draws the tape through the machine at play speed. The tape pulls the upstream capstan up to play speed during which time the clutch 50 overruns, allowing the upstream capstan 34 and flywheel to overrun or "float" slightly faster than the pulley 26.

The differential between the surface speeds of the capstan surfaces engaging the tape is important.

The actual speed differential between the capstans will preferably be quite small, in the order of 0.83 per cent. This could of course be achieved by machining the capstan shafts with different diameters. However, it requires less precision and more commercially practicable, to machine one or more of the pulleys 22, 24 and 26 with different diameters. For this reason, I prefer to achieve the desired surface speed differential, bu using different diameter pulleys rather than different diameter capstans.

The principle of operation is shown in simplified form in FIGS. 1 and 2. At the instant after the pressure rollers 36 and 46 pinch the tape against the respective capstans, the downstream capstan 44 moves the corresponding downstream portion of the tape at play speed, and the upstream capstan 34 moves the corresponding upstream portion of the tape at slightly slower speed, namely 99.97 per cent of play speed in the example given above. During the next few moments, the downstream capstan pulls the tape causing it to accelerate to play speed. During this acceleration, the tape stretches momentarily, but well within its yield point because of the small differential in capstan speed, and then returns to normal length. At the end of the acceleration period, the tape is being driven at play speed solely by the downstream capstan — the upstream capstan being driven at play speed by the pull of the tape. The pulley 26 is still being driven at less than play speed while the overrunning clutch 50 automatically free wheels enabling the upstream capstan 34 to "float" at play speed independent of the motor. The flywheel, carried integral with the upstream capstan, stabilizes the latter. But after the play mode is established following the initial, acceleration phase for the upstream capstan, tape is driven by pull from the downstream capstan; and momentary speed fluctuations are smoothed out, and tape held taut about the head means, by the stabilizing influence of the flywheel.

A preferred form of the tape transport mechanism is shown in more detail in FIGS. 3-9. This is a compatible mechanism which plays an improved dual capstan type cartridge according to the principles shown in FIGS. 1 and 2, or, alternatively, plays a standard single capstan type cartridge. This compatible mechanism will now be described, using where possible the same reference numerals, for similar elements, as in FIGS. 1 and 2.

The tape transport mechanism is generally designated 52. An improved dual capstan type cartridge 54 is shown in play position in FIG. 7. A standard single capstan type cartridge 56 is shown in play position in FIG. 8.

The tape transport mechanism 52 comprises a frame including a horizontal base plate 58. To play the dual capstan type cartridge 54, the magnetic tape 32 is trained along a path for movement successively, from left to right in FIG. 7, between upstream capstan 34 and upstream pressure roller 36, past record and play heads 40 and 42, and between downstream capstan 44 and downstream pressure roller 46. A constant speed, vertical motor 20 has a journal block 60 on the upper face thereof, mounted by bolts 62,62 (FIG. 3). The downstream capstan 44 is rotatably journaled within block 60 and is direct driven by motor 20. The entire bottom end portion 64 of the motor is rotatable and includes integral therewith a fan portion 66 and a driving pulley 68 connected by belt 70 to driven pulley 26 which, in turn, drives flywheel 48 and capstan 34 integral therewith. The pulley 26 drives the flywheel and capstan through overrunning clutch 50. The flywheel 48 and upstream capstan 34 are rotatably journaled in a journal block 72 mounted by bolts 74, 74 (FIG. 3) to the bottom of the base plate 58.

Drive transmission means is provided between the motor and both capstans for driving them simultaneously, but at different speeds in off mode according to the principles described in connection with FIGS. 1 and 2. This drive transmission means consists of the direct connection between the motor and the downstream capstan 44, the belt 70 connecting the driving pulley 68 with the driven pulley 26, and the overrunning clutch 50 which will now be described in detail.

The overrunning clutch 50 (FIGS. 9 and 10) comprises an outer race member 76 pressed-fitted into a bore 78 in pulley 26, and an inner race member 80 having internal threads 82 engaging external threads 84 on a lower axial extension of the flywheel 48. The inner and outer races are relatively rotatably journaled by roller-bearings 86. Conventional, non-circular sprags 88 enable the motor 20 to drive the flywheel 48 and capstan 34 in the direction of the arrows in FIG. 4 (clockwise as seen from below) while enabling the overrunning clutch 50 to freewheel and permit the flywheel to overrun in that same direction faster than the pulley 26.

Figure 9:
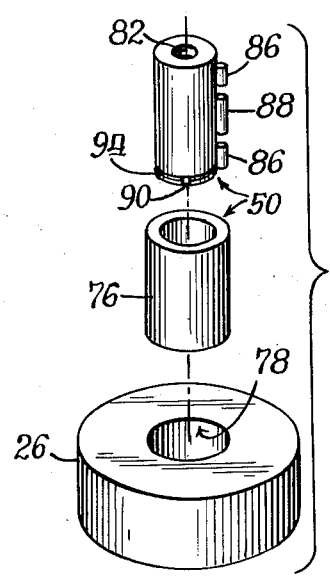
FIG. 9 is an exploded perspective view of the driven pulley and the overrunning clutch shown in FIG. 4.
Figure 10:
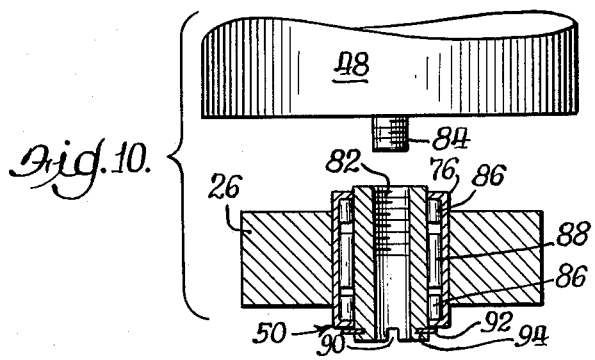
FIG. 10 is an enlarged fragmentary view of FIG. 4 showing a portion of the fly-wheel and a vertical cross-section of the driven pulley and overrunning clutch.
Figure 11:
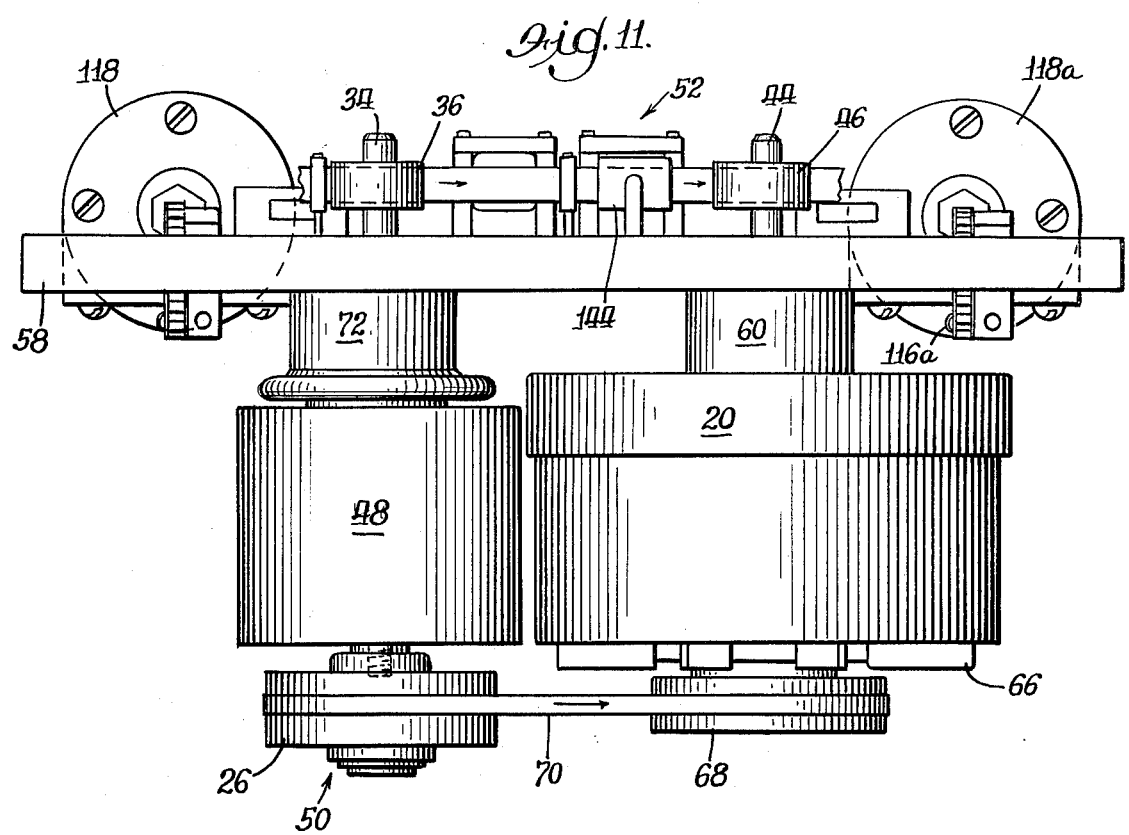
FIG. 11 is a view similar to FIG. 4, with a portion of the tape of the improved dual capstan cartridge, in play mode.

As best shown in FIGS. 9 and 10, a screwdriver slot 90 is provided at the bottom of the inner race member to facilitate assembly. And a C-washer 92 is seated in a groove 94 to hold the overrunning clutch assembled.

In the embodiment shown in FIGS. 3-11, the pulleys 26 and 68 are nominally 2 inches in diameter. For the driven pulley 26 to rotate 0.03 per cent slower than the driving pulley 68, as given in the example above, it must be 0.0006 inches larger in diameter. By making the upstream capstan rotate only very slightly slower, when both capstans are motor driven in off mode, the upstream capstan will always be running almost at play speed, so that when a dual capstan type cartridge 54 is placed in play mode, very little acceleration of the tape at the upstream capstan will be required to bring the capstan up to play speed and therefore stretch of the tape during the acceleration period will not exceed the yield point of the tape material.

The record head 40 and play head 42 are each mounted on a block 96 adjustable by means of screws 98, 100, and 102. A similar mounting and adjusting arrangement is shown and described in my U.S. Pat. No. 3,800,323 to which reference may be made for details. Stationary tape guides 104 and 106 are mounted on brackets 108 and 110 fastened to the base plate 58.

First and second axially aligned shafts 112 and 112a respectively are oscillatably journaled in a bore 114 in base plate 58. Shaft 112 is oscillatably biased in a clockwise direction (FIG. 5) by spring 116 and are oscillated in the opposite direction against the bias of the spring by solenoid 118. Similarly, shaft 112a is biased in one direction by spring 116a and oscillated in the opposite direction by solenoid 118a. This oscillating arrangement will be described with reference to FIG. 5 where a split coupling 120, with a cylindrical external surface 122, is fastened to first shaft 112. Another, identical, split coupling is fastened to the second shaft 112a. A chain 124, with an intermediate link engaging a pin 126 extending from coupling surface 122, has one end fastened to a link 128 having its opposite portion threadedly engaged with the solenoid plunger 130 and held in proper adjusted position by a lock nut 132. The opposite end of the chain is fastened to spring 116 (or 116a). The end of the spring is anchored to the solenoid casing at 134.

Referring now to FIGS. 3, 5, 6 and 7, the following elements are mounted on the first shaft 112 and are oscillatable with it: Tape guides 138 and 142; upstream pressure roller 36; and a curved shield 144. The downstream pressure roller 46 is mounted on the second shaft 112a.

The upstream pressure roller 36 is rotatably mounted on an arm 136 extending radially from shaft 112. Tape guide 138 is positioned immediately upstream of the pressure roller 36 and comprises a hardened pin 140 engageable with the backside of the tape and is mounted on the shaft 112 by a radial arm 139. A clearance opening 148 is provided in base plate 58 for capstan 34, pressure roller 36 and tape guide 138.

Tape guide 142 is identical to guide 138 and engages the backside of the tape between heads 40 and 42 for the purpose of improving the wrap about the heads. Shield 144 is mounted on a radial arm 146 and is movable to a position on the backside of the tape opposite play head 42. A clearance opening 150 is provided in base plate 58 for the guide 142 and shield 144.

The downstream pressure roller 46 is identical to roller 36, being rotatably journaled on radial arm 136 mounted on the second shaft 112a. A clearance opening 152 is provided in the base plate for the downstream capstan 44 and pressure roller 46.

Figure 8:
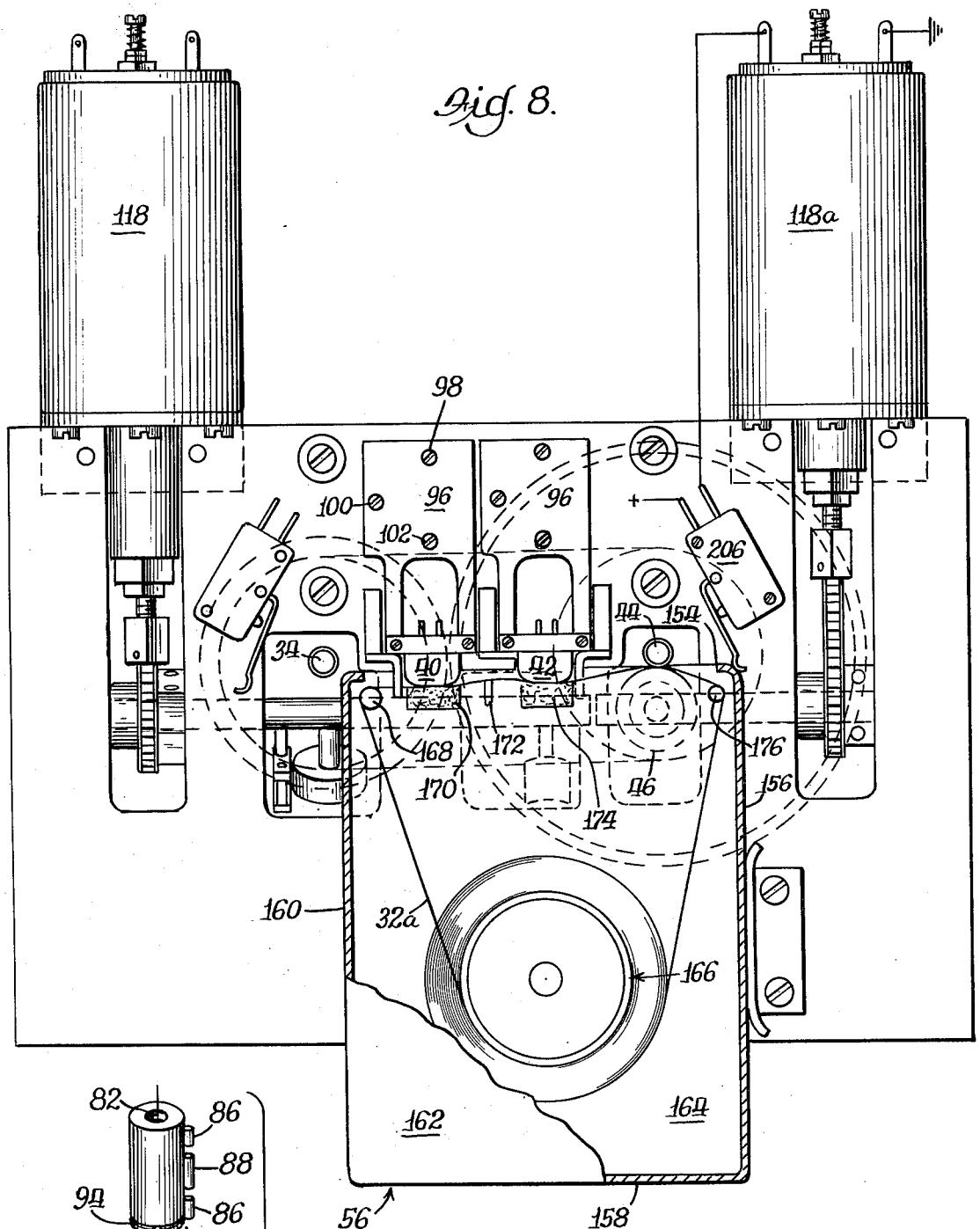
FIG. 8 is a view similar to FIG. 6 showing the tape transport mechanism in play mode with a standard single capstan type cartridge.

Before describing optional use of the compatible tape transport mechanism either with the standard single capstan cartridge 56 shown in FIG. 8, or the improved dual capstan type cartridge 54 shown in FIG. 7, their structural features will be compared.

Referring to FIG. 8, the standard cartridge 56 comprises a rectangular plastics housing having four side walls 154, 156, 158, and 160, and top and bottom covers 162 and 164. The top cover is broken away in FIG. 8 to show the internal arrangement. An endless tape 32a is wound on a roll about reel 166 which is rotatably journaled between the top and bottom covers and is trained as follows:

(a) From the inner convolution of the roll to, and around, a stationary, upstream guidepost 168;
(b) past a first pressure pad 170 which presses the tape against the curved face of the record head;
(c) across a stationary guidepost 172 intermediate the heads;
(d) past a second pressure pad 174 which presses the tape against the curved face of the play head;
(e) between capstan 44 and pressure roller 46; and
(f) around a stationary, downstream guidepost 176 to the outside convolution of the roll.

Among the problems encountered with the standard cartridge 56 is that guideposts 168, 172 and 176 are all integral parts of the molded plastics case which are subject to warping and can therefore cause tape skew and phase error in stereo recording and reproducing. Further, the pressure pads 170 and 174 are made of resilient, cellular, elastomeric materials which are not perfectly uniform so, pressure of the tape against the heads, and the approach and the departure angles, are not precisely uniform in multi-track recording and therefore can create a number of problems including phase errors and poor low frequency response. Another disadvantage is that pressure pad 174 occupies space needed for a shield opposite the play head, thereby allowing the magnetic field from the drive motor to affect play back, or require use of a special play head which does not have good low frequency response.

Referring now to FIG. 7, the improved dual capstan type cartridge 54 comprises a rectangular plastics housing having four sidewalls 178, 180, 182 and 184 and top and bottom covers 186 and 188, most of the top cover being removed to show the internal arrangement. Endless tape 32 is wound on a storage roll 190 about a reel 192 which is rotatably journaled between the covers and is trained as follows:

(a) In a first leg, from the inner convolution of the roll to a first corner post 194 at the left rear corner of the housing;

(b) forward, between left hand sidewall 184 and inner wall 196 to, and around, a small corner pin 198;

(c) to the right along wall 178 to, and around, another small corner pin 200, and thence to the outer convolution of the storage roll.

An important feature of the present invention is that all guiding and driving elements contacting the tape during play mode are part of the tape transport mechanism itself and therefore can be made with the great precision needed for consistent, uniform, superior quality recording and play back.

A guide bracket 202 fastened to the base plate by screws 204, 204 is so positioned that a standard cartridge 56 when inserted along the guide bracket to play position as shown in FIG. 8, will close only switch 206a and energize solenoid 118a. The wider, dual capstan-type cartridge 54, when similarly inserted to play position as shown in FIG. 7, will close both switches 206 and 206a and energize both solenoids 118 and 118a.

Thus, the tape transport mechanism is automatically compatible for use either with the improved cartridge 54 or the standard cartridge 56.

As stated, the tape transport mechanism will preferably be operated in off mode with both capstans running continuously, the upstream capstan 34 rotating at a slightly lower speed than the downstream capstan 44. When the improved cartridge 54 is inserted into play position, both solenoids 118 and 118a will be energized thereby oscillating the shafts 112 and 112a to swing tape guide 138 up to a position engaging the back side of the tape and releasing it from the pin 198. Upstream pressure roller 36 will press the tape against the upstream capstan 34 which, at the moment of engagement, is rotating 0.03 per cent slower than capstan 44. The tape guide 142 will engage the back side of the tape between the heads 40 and 42. The shield 144 will cover the play head face behind the tape. And the downstream pressure roller 46 will press the tape into driving engagement with the downsteam capstan 44. The tape, during a very short acceleration period, will pull capstan 34 up to play speed while the overrunning clutch 50 free wheels, allowing the capstan 34 to "float" independently of the motor 20, stabilized by the flywheel 48.

An important feature of the invention, shown in FIG. 7, is that the wrap of tape about the heads 40 and 42 is achieved entirely by the rollers 36 and 46 and the intermediate guide 142, all of which are precision elements forming part of the tape transport mechanism.

Figure 12:
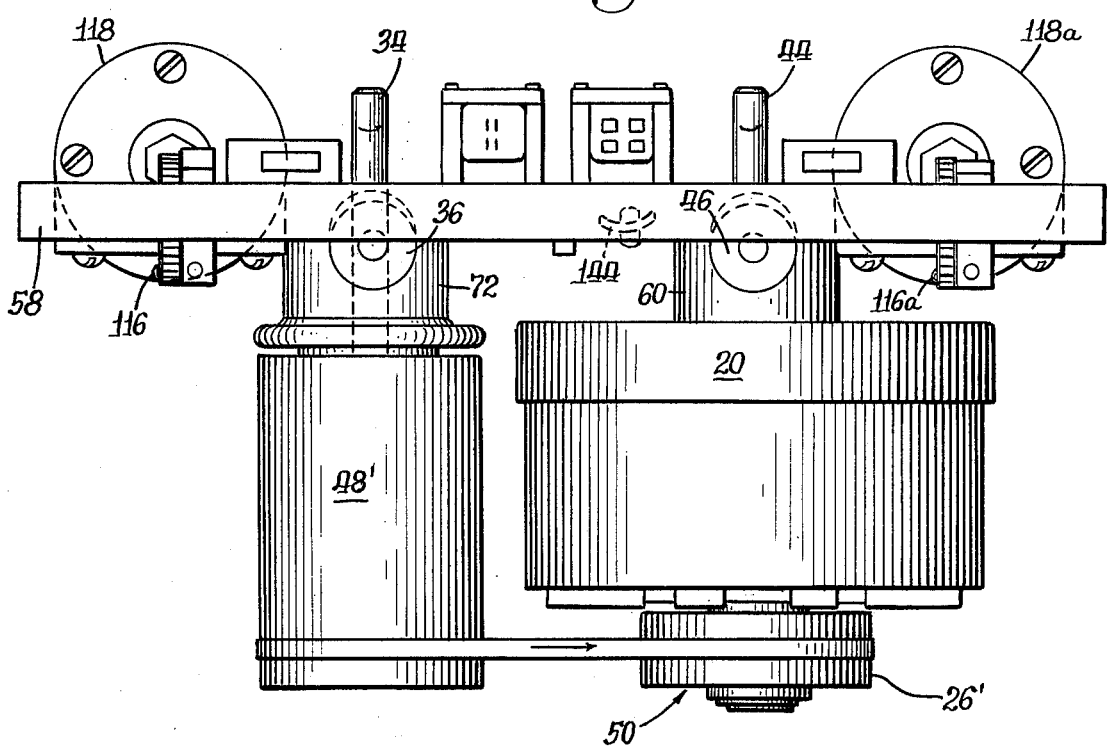
FIG. 12 is a view similar to FIG. 4, of an alternate form of the tape transport mechanism, in off mode.

The above described tape transport mechanism and dual capstan type cartridge are illustrative of a small number of many possible specific embodiments of the invention. Numerous and varied other arrangements can readily be devised in accordance with the principles disclosed by those skilled in the art without departing from the spirit and scope of the invention. For example, in FIG. 12, the overrunning clutch 50 is incorporated in the pulley 26' which drives the combined pulley and flywheel 48' directly.

The embodiments of the invention in which an exclusive property or privilege is claimed are defined as follows:

1. In a tape transport mechanism:

a frame;

a cartridge-supporting table on said frame;

means for training a magnetic tape along a path on said table, an upstream capstan, head means, and a downstream capstan located along the path of movement of the tape;

upstream and downstream shafts pivotably journaled in said frame for independent pivotal movement about their respective axes and having upstream and downstream pressure rollers respectively mounted thereon for independent swinging movements between off positions beneath said table to play positions above said table, said pressure rollers in said play positions being effective to press said tape against said upstream and downstream capstans respectively;

first actuating means for pivoting said downstream shaft to swing said downstream pressure roller to its said play position independently of the other shaft and pressure roller, to thereby play a single capstan type cartridge when placed in play position over said downstream capstan and pressure roller;

a second actuating means for pivoting both of said shafts simultaneously to move both of said pressure rollers to their said play positions, to thereby play a dual capstan type cartridge when placed in play position on said table over both said upstream and downstream capstans and pressure rollers; and control means selectively operable to actuate said first or second actuating means.

2. In a tape transport mechanism, the combination of claim 1 including tape guide post means mounted on said upstream shaft for movement with the upstream pressure roller between an off position beneath said table and a play position above said table in guiding contact with the backside of the tape.

3. In a tape transport mechanism, the combination of claim 2 in which said tape guide post means is engageable with the backside of the tape in two separate locations, one of said locations being ahead of the upstream capstan and the other of said locations being adjacent the head means.

4. In a tape transport mechanism, the combination of claim 2 including shield means mounted on said upstream shaft for movement with the upstream pressure roller and the tape guide post means between an off position beneath said table and a play position above position above said table on the backside of the tape opposite the play portion of said head means.

5. In a tape transport mechanism, the combination of claim 1 in which said first actuating means includes solenoid means connected to said downstream shaft, and said second actuating means includes solenoid means connected to both of said shafts, and said control means includes switch means for selectively energizing either the solenoid means of the first actuating means or the solenoid means of the second actuating means.

6. In a tape transport mechanism, the combination of claim 5 in which said switch means includes a separate switch for controlling energization of each solenoid means, the actuators of said switches are spaced apart wider than the housing of a single capstan type cartridge, and said switches are positioned on said table enabling only the switch for the solenoid means of the first actuating means to be actuated in response to insertion of a single capstan type cartridge in its said play position, and enabling both of said switches to be actuated in response to insertion of a wider double capstan type cartridge in its said play position.

* * * * *

UNITED STATES PATENT OFFICE
CERTIFICATE OF CORRECTION

Patent No. 4,096,533　　　　　　　　　　Dated　June 20, 1978

Inventor(s)　John P. Jenkins

It is certified that error appears in the above-identified patent and that said Letters Patent are hereby corrected as shown below:

Column 2, line 59 insert --plan-- between "top" and "view".

Column 4, line 13 delete "bu" and insert --by--.

Column 8 line 58 delete "above".

Column 8 line 59 delete "position".

*Signed and Sealed this*

*Twenty-third* Day of *January 1979*

[SEAL]

Attest:

RUTH C. MASON
*Attesting Officer*

DONALD W. BANNER
*Commissioner of Patents and Trademarks*